(12) United States Patent
McKean

(10) Patent No.: US 8,307,159 B2
(45) Date of Patent: Nov. 6, 2012

(54) SYSTEM AND METHOD FOR PROVIDING PERFORMANCE-ENHANCED REBUILD OF A SOLID-STATE DRIVE (SSD) IN A SOLID-STATE DRIVE HARD DISK DRIVE (SSD HDD) REDUNDANT ARRAY OF INEXPENSIVE DISKS 1 (RAID 1) PAIR

(75) Inventor: Brian McKean, Longmont, CO (US)

(73) Assignee: Netapp, Inc., Sunnyvale, CA (US)

( * ) Notice: Subject to any disclaimer, the term of this patent is extended or adjusted under 35 U.S.C. 154(b) by 0 days.

(21) Appl. No.: 13/346,274

(22) Filed: Jan. 9, 2012

(65) Prior Publication Data
US 2012/0110252 A1 May 3, 2012

Related U.S. Application Data

(63) Continuation of application No. 12/286,591, filed on Sep. 30, 2008, now Pat. No. 8,103,825.

(51) Int. Cl.
*G06F 12/00* (2006.01)
(52) U.S. Cl. .............................. 711/114; 711/E12.001
(58) Field of Classification Search ........... 711/E12.001, 711/114, 162
See application file for complete search history.

(56) References Cited

U.S. PATENT DOCUMENTS

| | | | |
|---|---|---|---|
| 2003/0135674 A1* | 7/2003 | Mason et al. | 710/74 |
| 2005/0102552 A1* | 5/2005 | Horn | 714/6 |
| 2009/0204758 A1* | 8/2009 | Luning | 711/114 |
| 2010/0017649 A1* | 1/2010 | Wu et al. | 714/6 |
| 2010/0049914 A1* | 2/2010 | Goodwin | 711/114 |

* cited by examiner

*Primary Examiner* — Edward Dudek, Jr.
*Assistant Examiner* — John P Fishburn
(74) *Attorney, Agent, or Firm* — Haynes and Boone, LLP

(57) ABSTRACT

The present invention is a method for implementing a storage system. The storage system may include a disk array having a disk drive pair which includes a solid-state disk drive and a hard disk drive. The method may include the step of copying a data subset of a data set from the hard disk drive to a spare solid-state disk drive during a solid-state disk drive rebuild process. The data subset includes a first amount of data and the data set includes a second amount of data, where the first amount of data is less than the second amount of data. The method may further include the step of receiving a read request from a host server requesting the data subset. The method further includes the step of directing the read command to the spare solid-state disk drive.

18 Claims, 4 Drawing Sheets

SYSTEM AND METHOD FOR PROVIDING PERFORMANCE-ENHANCED REBUILD OF A SOLID-STATE DRIVE (SSD) IN A SOLID-STATE DRIVE HARD DISK DRIVE (SSD HDD) REDUNDANT ARRAY OF INEXPENSIVE DISKS 1 (RAID 1) PAIR

CROSS REFERENCE

This application is a Continuation of U.S. Ser. No. 12/286,591, filed Sep. 30, 2008, now U.S. Pat. No. 8,103,825, issued Jan. 24, 2012, and entitled, "A System and Method for Providing Performance-Enhanced Rebuild of a Solid-State Drive (SSD) in a Solid-State Drive Hard Disk Drive (SSD HDD) Redundant Array of Inexpensive Disks 1 (Raid 1) Pair," the entire disclosure of which is incorporated herein by reference in its entirety.

FIELD OF THE INVENTION

The present invention relates to the field of electronic data storage and particularly to a system and method for providing performance-enhanced rebuild of a Solid-State Drive (SSD) in a Solid-State Drive Hard Disk Drive (SSD HDD) Redundant Array of Inexpensive Disks 1 (RAID 1) pair.

BACKGROUND OF THE INVENTION

Currently available storage systems for providing redundancy may not provide a desired level of performance.

Therefore, it may be desirable to provide a storage system which addresses the above-referenced problems of currently available storage system solutions.

SUMMARY OF THE INVENTION

Accordingly, an embodiment of the present invention is directed to a storage system, including: a disk array, the disk array including a disk drive pair, the disk drive pair including a solid-state disk drive and a hard disk drive, wherein the disk array is provided as a Redundant Array of Inexpensive Disks (RAID) configuration, the disk drive pair being a RAID disk drive pair; and a disk array controller, the disk array controller configured for being communicatively coupled with the disk array and a host server, the disk array controller being further configured for reading from the disk array and writing to the disk array based upon commands received from the host server, wherein the storage system is configured for copying a data set from the hard disk drive to a spare solid-state disk drive of the disk array during a solid-state disk drive rebuild process, the storage system being further configured, prior to completion of copying of the data set from the hard disk drive to the spare solid-state disk drive, for reading a subset of the data set from the spare solid-state disk drive based upon a read command requesting said subset of data, said subset of the data set including a first amount of data, said data set including a second amount of data, said first amount of data being less than said second amount of data.

A further embodiment of the present invention is directed to a method for implementing a storage system, the storage system including a disk array, the disk array including a disk drive pair, the disk drive pair including a solid-state disk drive and a hard disk drive, said method including: copying a data subset of a data set from the hard disk drive to a spare solid-state disk drive during a solid-state disk drive rebuild process, wherein the data subset includes a first amount of data and said data set includes a second amount of data, said first amount of data being less than said second amount of data; receiving a read command from a host server, said read command requesting the data subset; directing the read command to the spare solid-state disk drive; and prior to completion of copying of the data set from the hard disk drive to the spare solid-state disk drive, reading the data subset from the spare solid-state disk drive based upon the read command.

An additional embodiment of the present invention is directed to a computer-readable medium having computer-executable instructions for performing a method for implementing a storage system, the storage system including a disk array, the disk array including a disk drive pair, the disk drive pair including a solid-state disk drive and a hard disk drive, said method including: copying a data subset of a data set from the hard disk drive to a spare solid-state disk drive during a solid-state disk drive rebuild process, wherein the data subset includes a first amount of data and said data set includes a second amount of data, said first amount of data being less than said second amount of data; receiving a read command from a host server, said read command requesting the data subset; directing the read command to the spare solid-state disk drive; and prior to completion of copying of the data set from the hard disk drive to the spare solid-state disk drive, reading the data subset from the spare solid-state disk drive based upon the read command.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Redundancy for disk array controllers may be achieved through implementation of Redundant Array of Inexpensive Disks (RAID) technology and similar types of disk drives. For example, Level 1 RAID (RAID 1) may involve creating/implementing a mirrored pair of disk drives. Often, disk drives of similar size/storage capacity and having similar performance levels are paired. Hard disk drives of the same disk drive class will often have similar read and write performances. For example, a hard disk drive having a 15,000 revolutions per minute (rpm) spindle speed will generally perform similarly to another hard disk drive with the same spindle speed. Alternatively, a hard disk drive having a 15,000 revolutions per minute (rpm) spindle speed will generally perform much better than a hard disk drive having a 7,200 rpm spindle speed.

One possible storage system which may be created/implemented involves implementing a mirrored pair of disk drives which includes a hard disk drive and a Dynamic Random Access Memory (DRAM)-based storage device/disk drive. For example, the system may minor data written to both the DRAM-based disk drive and the hard disk drive. Further, said system may include a disk array controller which may be configured to direct all reads to the DRAM-based disk drive. However, during a power cycle, the DRAM-based disk drive of said system may lose data. After the power cycle, the disk array controller may read data from the hard disk drive and load the DRAM-based disk drive. Further, while the DRAM-based disk drive of said mirrored pair of disk drives may provide high write performance, the overall write performance of said system/said mirrored pair of disk drives may be limited by the write performance of the hard disk drive, which may typically be much lower than that of DRAM-based disk drives.

Figure 1:
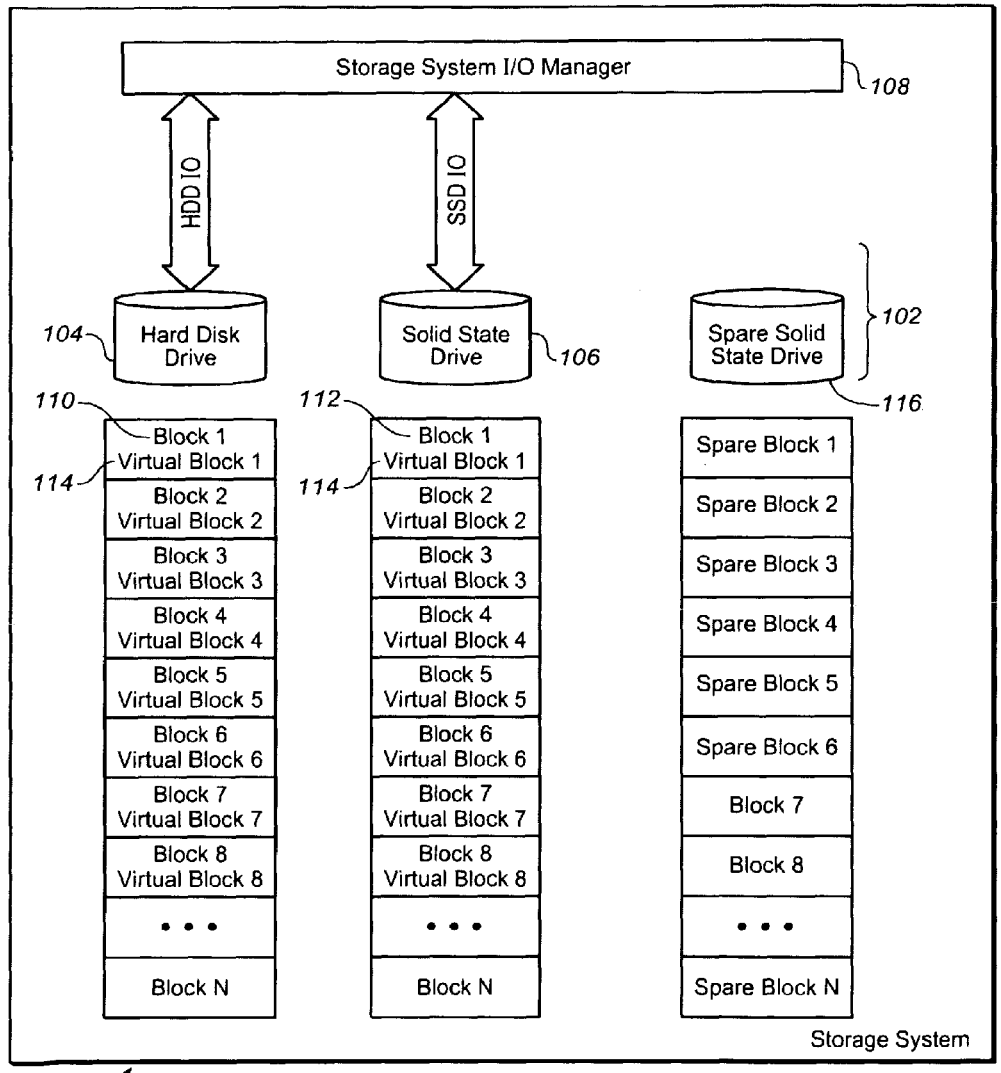
FIG. 1 is a block diagram of a storage system in accordance with an exemplary embodiment of the present invention.

Referring to FIG. 1, a storage system 100, in accordance with an exemplary embodiment of the present invention is shown. The storage system 100 may include a disk array 102. For example, the disk array 102 may include a plurality of disk drives (104, 106). Further, the disk array 102 may be provided/configured as a Redundant Array of Inexpensive Disks (RAID) configuration. For instance, the disk array 102 may be configured as a Level 1 RAID configuration (RAID 1 configuration)/RAID 1 redundancy group(s).

In current embodiments of the present invention, at least two disk drives (ex.—104 and 106) included in the plurality of disk drives may form a disk drive set/disk drive pair. For example, the disk drive pair may be configured as a RAID 1 disk drive pair, with a first disk drive 104 of the disk drive pair mirroring data of (ex.—storing a same set of data as) a second disk drive 106 of the disk drive pair. In further embodiments, multiple disk drive sets/pairs (ex.—multiple RAID 1 disk drive pairs) may be formed by disk drives included in the plurality of disk drives of the disk array 102.

In additional embodiments of the present invention, the storage system 100 may include a disk array controller (ex.—a storage system Input/Output (I/O) manager) 108. The disk array controller 108 may be configured for being communicatively coupled with the disk array 102. Further, the disk array controller 108 may be configured for being communicatively coupled with a host server (not shown). The disk array controller 108 may be configured for managing distribution of data across the plurality of disk drives (104, 106) of the disk array 102. The disk array controller 108 may perform said data distribution management in response to commands (ex.—read commands, write commands) received by the disk array controller 108 from the host server. In exemplary embodiments, the disk array controller 108 may be a hardware/hardware-based disk array controller 108. In further embodiments, the disk array controller 108 may be a software/software-based/operating system based disk array controller 108. In still further embodiments, the disk array controller 108 may be a firmware/driver-based disk array controller 108.

FIG. 1 further illustrates a physical disk drive data layout 110 for the first disk drive 104 of the disk drive pair and a physical disk drive data layout 112 for the second disk drive 106 of the disk drive pair when the disk drive pair is a mirrored (ex.—RAID 1) pair. When the disk array 102 and the disk drive pair are configured as RAID 1, if a disk drive of the disk drive pair fails (ex.—due to a hardware or software malfunction), the RAID 1 configuration may prevent data from being lost from the disk drive set/pair as long as one disk drive (ex.—disk drive 104 or disk drive 106) of the disk drive set/pair/mirrored pair remains functional. In the illustrated embodiment, the disk drive pair (and/or the disk array 102) may be viewed by/perceived by/treated by the host server as a single, virtual disk drive having a virtual disk drive data layout 114 as shown in FIG. 1. Still further, the total storage capacity of the disk array 102 may be limited to a value equal to a storage capacity value for the lowest storage capacity disk drive of the disk array 102.

In exemplary embodiments of the present invention, the first disk drive 104 of the disk drive pair may be a hard disk drive 104. Further, the second disk drive 106 of the disk drive pair may be a solid-state disk drive 106. For example, the solid-state disk drive 106 may be flash drive, such as a Not and (NAND) flash drive 106. NAND flash drives may characteristically have much greater random read performance than the hard disk drives. Although random write performance for NAND flash drives may range from being much worse to much greater than random write performance of hard disk drives, NAND flash drives are characteristically far superior to hard disk drives in terms of random read performance (ex.—100 times faster/better random read performance than hard disk drives).

In current embodiments of the present invention, the disk array controller 108 may be configured for directing write commands to/writing data to/causing data to be written to the disk drive pair/disk array 102 based upon commands received from the host server. For instance, when the disk drive pair is a mirrored pair, such as a RAID 1 pair, any data which is written to the first disk drive/hard disk drive 104 is also written to the second disk drive/solid-state disk drive 106 (ex.—the NAND flash drive). Consequently, the disk drive pair/disk array 102 is limited in its write performance by the speed of the slowest performing disk drive (ex.—the disk drive having the lesser write performance) of the disk drive pair/set/array 102.

In additional embodiments of the present invention, the disk array controller 108 may be configured for directing read commands to/reading data from/causing data to be read from the disk array 102 based upon commands received from the host server. For example, when the disk drive pair of the disk array 102 is a mirrored pair, such as a RAID 1 pair, the disk array controller 108 may be configured for directing read commands exclusively to/reading data exclusively from/causing data to be read exclusively from the solid-state disk drive 106 (ex.—the NAND flash drive). By directing all reads/read commands exclusively to and reading data exclusively from the NAND flash drive 106 of the disk drive pair (ex.—RAID 1 pair), the storage system 100 of the present invention may take advantage of the typically much higher read performance of solid-state disk drives/NAND flash drives as compared to the read performance of the hard disk drive 104, thereby allowing disk drive pair(s) of the disk array 102 of the present invention to provide superior read performance compared to disk drive pairs/sets/disk arrays which implement only hard disk drives. Alternatively, the disk array controller 108 may be configured for directing read commands to/reading data from/causing data to be read from the hard disk drive 104 and/or the solid-state disk drive 106.

Although solid-state disk drives (ex.—NAND flash drives) may provide the advantage of far superior read performance (ex.—faster reads) compared to hard disk drives, the solid-state disk drives are often much more expensive per unit of capacity than hard disk drives. However, the present invention, by configuring a disk array 102 which may implement hard disk drive/solid-state disk drive pair(s), is much less expensive than implementing a RAID disk array with similar user available capacity which includes only solid-state disk drives/solid-state disk drive pairs/solid-state disk drive groups, such as a Level 5 RAID (RAID 5) solid-state disk group/array. Further, the disk array 102 (ex.—RAID 1 configuration) of the present invention may provide better performance (ex.—100 times better random read performance, same write performance) and reliability than a RAID disk array, such as a RAID 5 disk array with similar user available capacity, which implements only solid-state disk drives/groups/sets/pairs.

In further embodiments, the solid-state disk drive/NAND flash drive 106 and the hard disk drive 104 of the disk drive pair may be performance-matched with respect to random write performance and storage capacity for promoting a decreased cost-to-performance ratio for the storage system 100. For example, a NAND flash drive 106 may be selected and paired with a hard disk drive 104, such that the NAND flash drive 106 and the hard disk drive 104 have a similar storage capacity and random write performance (since writes may be directed to both the NAND flash drive 106 and the hard disk drive 104).

In alternative embodiments, the solid-state disk drive 106 of the disk drive pair may implement Dynamic Random Access Memory (DRAM) and/or Static Random Access Memory (SRAM).

In exemplary embodiments, the disk array 102 may include one or more replacement/hot spare disk drives, such as a spare solid-state disk drive/hot spare solid-state disk drive 116. As discussed above, the system 100 of the present invention may be configured for directing all reads/read commands/read operations exclusively to the solid-state disk drive 106 (ex.—the NAND flash drive) of the disk drive pair and is further configured for directing the writes/write commands/write operations to both the solid-state disk drive 106 and the hard disk drive 104 of the disk drive pair. Consequently, if the hard disk drive 104 of the disk drive pair fails/is failing, but the solid-state disk drive 106 remains functional, a hard disk drive rebuild process may be initiated by the system 100 in which data from the solid-state disk drive 106 is copied/written to a spare hard disk drive. However, the performance of the storage system 100 during the hard disk drive rebuild process may be resistant to degradation/loss since the solid-state disk drive 106 may continue to perform/service reads and writes (since said solid-state disk drive 106 was already performing/servicing all of the reads/read commands prior to the failure and the write commands/writes were also already being serviced/performed by the solid-state disk drive 106 (along with the hard disk drive 104) prior to the failure). However, if an alternative scenario occurs in which the solid-state disk drive 106 fails/is failing but the hard disk drive 104 remains functional, a solid-state disk drive rebuild process may be initiated by the system 100 in which data from the hard disk drive is copied/written to a spare solid-state disk drive 116. During the solid-state disk drive rebuild process, performance of the disk array 102, particularly random read performance of the disk array 102, may fall off/degrade significantly since the hard disk drive 104 would have to service all system I/O traffic/system I/O requests (shown as "HDD I/O" and "SSD I/O" in FIG. 2), while the solid-state disk drive 106 is being rebuilt to the spare solid-state disk drive 116. Further, during solid-state disk drive rebuild, the hard disk drive 104 may have to service and/or supply I/Os (ex.—rebuild process I/Os, shown as "I/O for rebuild of SSD" in FIGS. 2 and 3) for carrying out the solid-state disk drive rebuild process/the copying of data from the hard disk drive to the spare solid-state disk drive 116.

Figure 2:
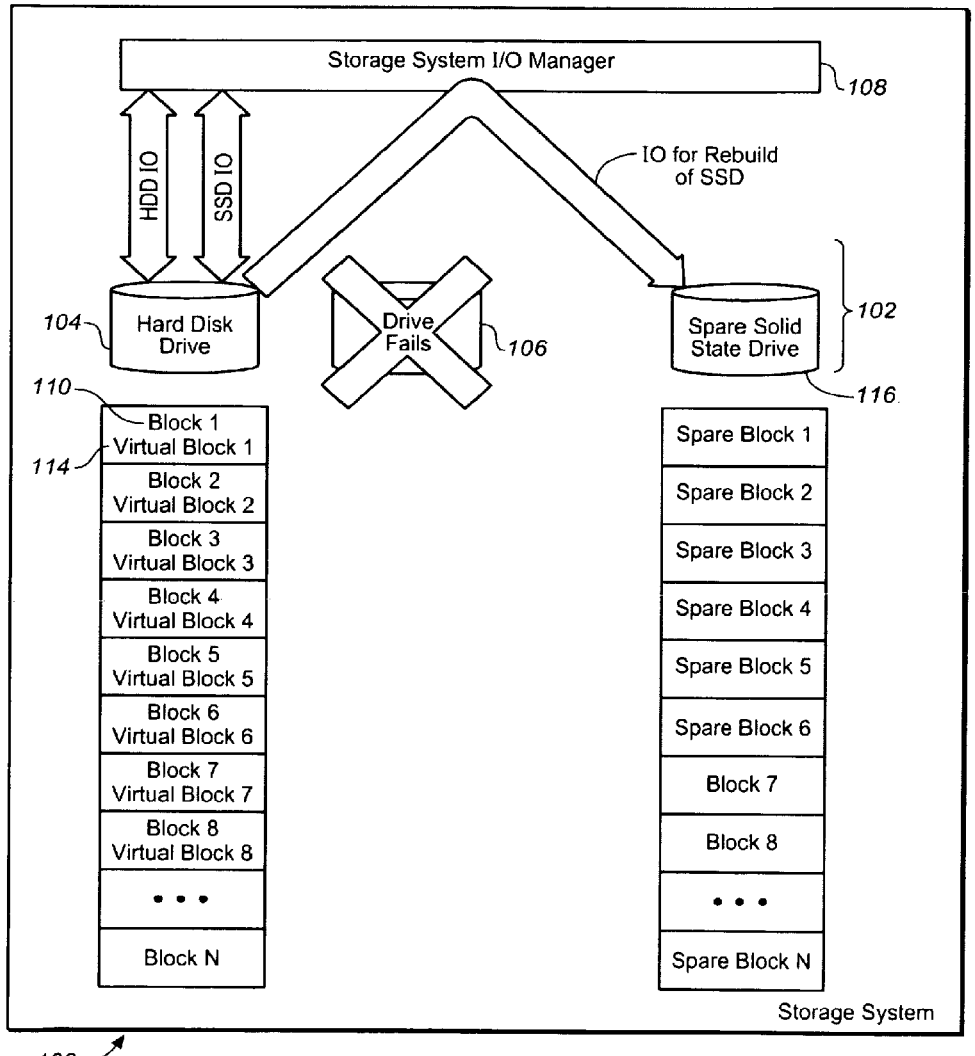
FIG. 2 is a block diagram of the storage system shown in FIG. 1, wherein a solid-state disk drive rebuild process is occurring/in progress.
Figure 3:
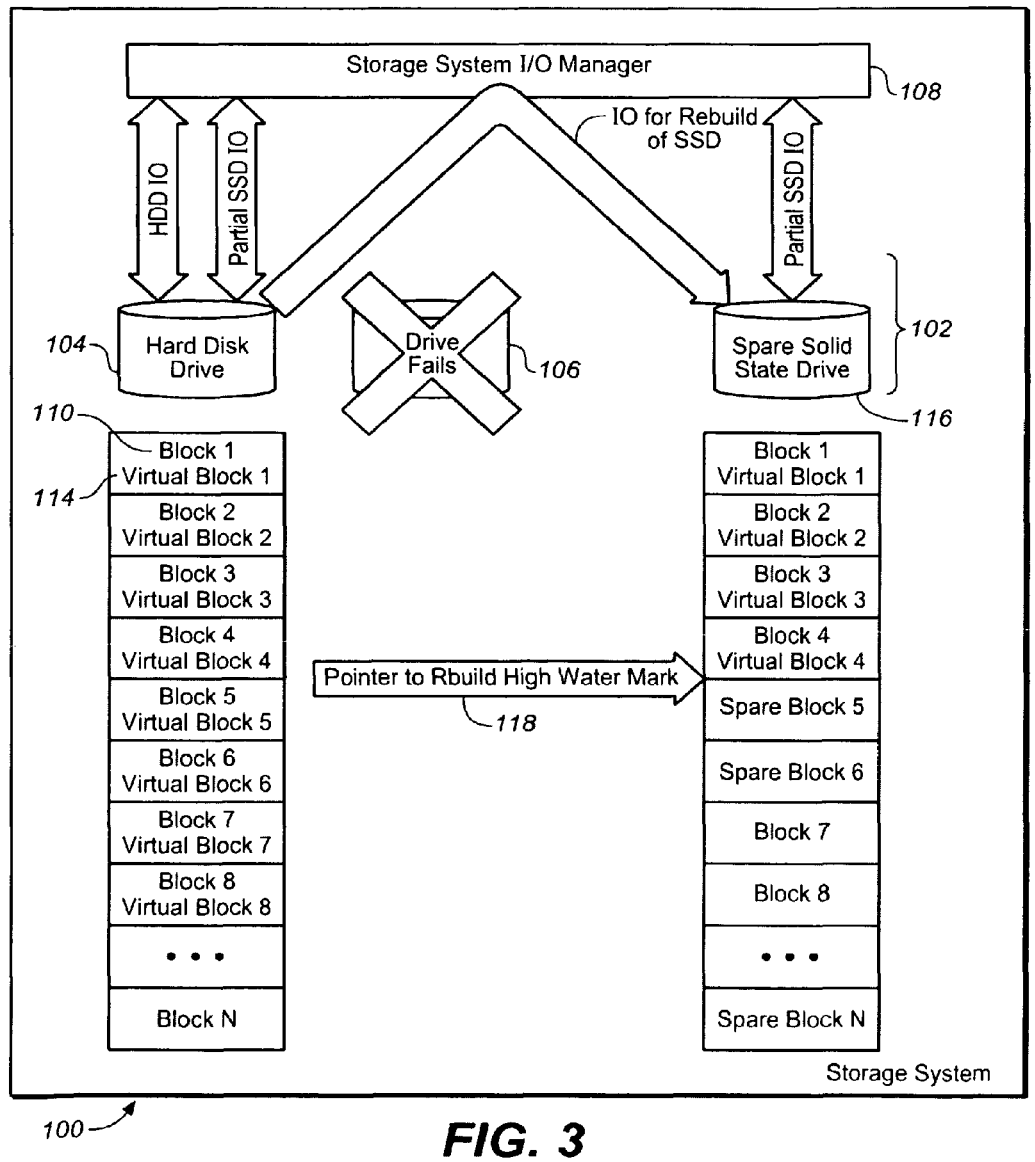
FIG. 3 is a block diagram of a storage system shown in FIGS. 1 and 2, wherein a portion of the Input/Output (I/O) traffic for the system is directed to the spare solid-state disk drive during the solid-state disk drive rebuild process.

In current embodiments of the present invention, after a failure of a disk drive of the disk array 102 has occurred, such as the failure of the solid-state disk drive 106 as shown in FIG. 2, the disk array controller 108 may be configured for directing the process of rebuilding data to the replacement drive(s), such as to the hot spare solid-state disk drive 116. For example, during the solid-state disk drive rebuild process, data (ex.—a data set) may be copied sequentially from the hard disk drive 104 to the spare solid-state disk drive/hot spare solid-state disk drive 116 (as shown in FIG. 2). In exemplary embodiments of the present invention, the storage system 100 may be configured for tracking a portion(s) of data (ex.—data subset(s)) which have been written/copied to the spare solid-state disk drive 116 during the solid-state disk drive rebuild process. For instance, while the solid-state disk drive rebuild process is still in progress, the storage system 100 may track which data portions have already been written/copied to the spare solid-state disk drive 116 from the hard disk drive 104 by providing/keeping a pointer 118 to a high-water mark/rebuild high-water mark of data which has been written/copied to the spare solid-state disk drive 116 (as shown in FIG. 3).

In additional embodiments of the present invention, during the solid-state disk drive rebuild process (ex.—during copying of the data from the hard disk drive 104 to the spare solid state disk drive 116), the storage system 100 (ex.—the disk array controller 108) may receive a read request from the host. For example, the read request may be a request for data/data portions which has/have already been copied to the spare solid state disk drive 116, even though the solid-state disk drive rebuild process may still be in progress (ex.—the entirety/full amount of the data from the hard disk drive 104 has not yet been copied to the spare solid state disk drive 116). When the read request is a request for data/data portions which has/have already been copied from the hard disk drive 104 to the spare solid state disk drive 116, the storage system 100 may be configured for directing the read request to the spare solid state disk drive 116 (as shown in FIG. 3 "Partial SSD I/O"). In this way, the system 100 of the present invention is configured to allow the spare solid-state disk drive 116 to service a portion of the I/O stream that would have been handled by the solid-state disk drive 106 prior to failure of said solid-state disk drive 106, and to offload some of the I/O stream servicing duties from the hard disk drive 104 to the spare-solid state disk drive 116, even though the process of copying the entirety of the data from the hard disk drive 104 to the spare solid-state disk drive 116 (ex.—the solid-state disk drive rebuild process) may still be in progress.

Because of the above-described functionality, the storage system 100 of the present invention may be configured so that system performance may be gradually restored to the storage system 100 as the spare solid-state disk drive 116 is loaded with valid data/has valid data written or copied to it from the hard disk drive 104. Further, the storage system 100 of the present invention allows at least a portion of the data which has been copied to the spare solid-state disk drive 116 to be used (ex.—to be read in response to a host read request), even though the entirety of the data that is to be written/copied to the spare solid-state disk drive 116 has not yet been transferred to said spare solid-state disk drive 116 (ex.—even though the solid-state disk drive rebuild process has not yet been completed). By allowing incremental access to data of the spare solid-state disk drive 116 during rebuild/SSD rebuild in a SSD HDD RAID 1 pair as described above, increased performance of the storage system 100 during said solid-state disk drive rebuild process may be promoted.

Further, during (or just prior to) copying of the data/data set/data subset from the hard disk drive 104 to the spare solid-state disk drive 116, the storage system 100 (ex.—the disk array controller 108) may be configured for automatically replacing/swapping out the solid-state disk drive 106 of the disk drive pair with/for the spare solid-state disk drive 116, thereby pairing the spare solid-state disk drive 116 with the hard disk drive 104, the spare solid-state disk drive 116 including the data/data set/data subset copied from the solid-state disk drive 104.

Figure 4:
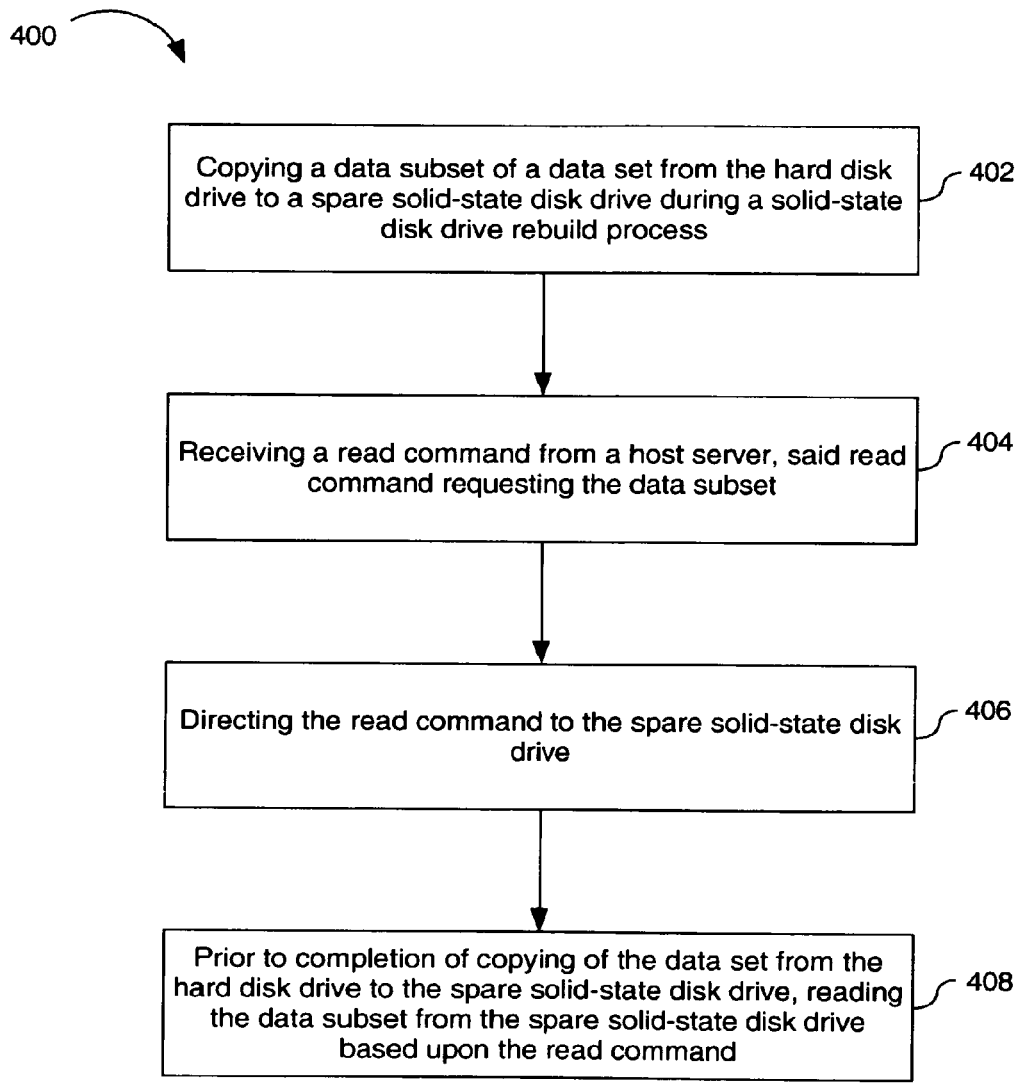
FIG. 4 is a flow chart illustrating a method for implementing a storage system of the present invention, in accordance with an exemplary embodiment of the present invention.

FIG. 4 is a flowchart illustrating a method for implementing a storage system including a disk array, the disk array including a disk drive pair, the disk drive pair including a solid-state disk drive and a hard disk drive in accordance with an exemplary embodiment of the invention. The method 400 may include the step of copying a data subset of a data set from the hard disk drive to a spare solid-state disk drive during a solid-state disk drive rebuild process 402. The data subset may include a first amount of data, while the data set may include a second amount of data, said first amount of data being less than said second amount of data. The method 400 may further include the step of receiving a read command from a host server, said read command requesting the data subset 404. The method 400 may further include directing the read command to the spare solid-state disk drive 406. The method 400 may further include, prior to completion of copying of the data set from the hard disk drive to the spare solid-state disk drive, reading the data subset from the spare solid-state disk drive based upon the read command 408. The method 400 may further include replacing the solid-state disk drive of the disk drive pair with the spare solid-state disk drive/hot spare solid-state disk drive, thereby pairing said spare solid-state disk drive with said hard disk dive 410. The spare solid-state disk drive may include at least one of: the data subset copied from the hard disk drive; and the data set copied from the hard disk drive.

The system 100 and method 400 of the present invention may be implemented in a variety of RAID storage products/storage systems and/or in any product/storage system implementing embedded storage. Further, the spare solid-state disk drive 116 may be configured as any one or more of the possible configurations of solid-state disk drive 106 mentioned above.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A storage system comprising:
a storage array, the storage array including a storage drive pair, the storage drive pair including a first type storage device and a second type storage device, wherein the storage array is provided as a Redundant Array of Inexpensive Disks (RAID) configuration, the storage drive pair being a RAID drive pair; and
a storage array controller, the storage array controller configured for being communicatively coupled with the storage array and a host server, the storage array controller being further configured for reading from the storage array and writing to the storage array based upon commands received from the host server,
wherein the storage system is configured for copying a data set from the second type storage device to a spare first type storage device of the storage array during a first type storage device rebuild process and tracking a portion of the data set that has been copied to the spare first type storage device by keeping a pointer to a rebuild high water mark of the portion of the data set that has been copied to the spare first type storage device, the storage system being further configured for reading, prior to completion of copying of the data set from the second type storage device to the spare first type storage device, a subset of the data set from the spare first type storage device based upon a read command requesting said subset of the data set, said subset of the data set including a first amount of data, said data set including a second amount of data, said first amount of data being less than said second amount of data.

2. The storage system of claim 1 in which the first type storage device comprises a solid-state drive (SSD), and further in which the second type storage device comprises a hard disk drive (HDD).

3. The storage system of claim 2 in which the SSD comprises a flash drive.

4. The storage system of claim 2 in which the SSD comprises a Not and (NAND) flash drive.

5. The storage system of claim 2 in which the SSD implements at least one of Dynamic Random Access Memory (DRAM) or Static Random Access Memory (SRAM).

6. The storage system of claim 1 in which the RAID configuration comprises a Level 1 RAID configuration (RAID 1 configuration) and the RAID storage drive pair comprises a RAID 1 storage drive pair.

7. The storage system of claim 1 in which the storage system is configured for automatically replacing the first type storage device of the storage drive pair with the spare first type storage device, thereby pairing the spare first type storage device with the second type storage device, the spare first type storage device including the copied data from the first type storage device.

8. A method for performing a storage drive rebuild operation in a storage system that includes a storage array having a first type storage device in a mirrored pair with a second type storage device, the method comprising:

copying a data set from the second type storage device to a spare first type storage device during a first type storage device rebuild process;

during copying the data set, tracking a portion of the data set that has been copied to the spare first type storage device by keeping a pointer to a rebuild high water mark of the portion of the data set that has been copied to the spare first type storage device, in which the portion of the data set is less than the full data set;

receiving a read command from a host server, the read command requesting first data from the data set, wherein the first data is indicated by the tracking to be in within the portion of data set that has been copied to the spare first type storage device;

directing the read command to the spare first type storage device; and prior to completion of copying the data set, reading the first data from the spare first type storage device in response to the read command.

9. The method of claim 8 in which the first type storage device and the second type storage device are implemented as a Redundant Array of Inexpensive Disks (RAID).

10. The method of claim 8 in which the storage array is configured as a Redundant Array of Inexpensive Disks (RAID), with the mirrored pair comprising a RAID drive pair.

11. The method of claim 10 in which the RAID comprises a Level 1 RAID configuration (RAID 1 configuration) and the RAID drive pair comprises a RAID 1 drive pair.

12. The method of claim 8 in which copying comprises:
replacing the first type storage device of the mirrored pair with the spare first type storage device, thereby pairing the spare first type storage device with the second type storage device.

13. The method of claim 8 in which the first type storage device comprises a solid-state drive (SSD), and further in which the second type storage device comprises a hard disk drive (HDD).

14. A computer program product having a computer readable medium tangibly recording computer program logic for performing a storage drive rebuild operation in a storage system that includes a storage array having a first storage device in a mirrored pair with a second storage device, in which the first storage device comprises a solid-state drive (SSD), and in which the second storage device comprises other than a SSD, the computer program product comprising:

code to copy a data set from the second storage device to a spare SSD during a SSD rebuild process;

code to track a portion of the data set that has been copied to the spare SSD during copying of the data set by keeping a pointer to a rebuild high water mark of the portion of the data set that has been copied to the spare first type storage device, in which the portion of the data set is less than the full data set;

code to receive a read command from a host server, the read command requesting first data from the data set, wherein the first data is indicated by the tracking to be in within the portion of the data set that has been copied to the spare SSD;

code to direct the read command to the spare SSD; and code to read the first data from the spare SSD in response to the read command prior to completion of copying the data set.

15. The computer program product of claim 14 in which the code to copy the data set comprises:
code to copy the data set from a Hard Disk Drive (HDD).

16. The computer program product of claim 14 in which the code to copy comprises:
code to replace the first storage device of the mirrored pair with the spare SSD, thereby pairing the spare SSD with the second storage device.

17. The computer program product of claim 14 further comprising:
code to implement the storage array as a Redundant Array of Inexpensive Disks (RAID).

18. The computer program product of claim 14 further comprising:
code to implement the storage array as a Redundant Array of Inexpensive Disks (RAID) level 1 drive pair.

* * * * *